United States Patent
McLean et al.

(10) Patent No.: US 7,063,910 B2
(45) Date of Patent: Jun. 20, 2006

(54) COMPACT CHEMICAL REACTOR WITH REACTOR FRAME

(75) Inventors: Gerard Francis McLean, West Vancouver (CA); Duhane Lam, Vancouver (CA); Olen Vanderleeden, Coquitlam (CA)

(73) Assignee: Angstrom Power (CA)

( * ) Notice: Subject to any disclaimer, the term of this patent is extended or adjusted under 35 U.S.C. 154(b) by 0 days.

(21) Appl. No.: 10/818,610

(22) Filed: Apr. 6, 2004

(65) Prior Publication Data
US 2005/0220682 A1   Oct. 6, 2005

(51) Int. Cl.
*H01M 2/08* (2006.01)
*H01M 2/14* (2006.01)

(52) U.S. Cl. ............... 429/34; 429/35; 429/36; 429/37; 429/38; 422/193

(58) Field of Classification Search ........... 422/193; 429/34–36, 37–38
See application file for complete search history.

(56) References Cited

U.S. PATENT DOCUMENTS

| | | | |
|---|---|---|---|
| 3,634,140 A | 1/1972 | Von Krusenstierna | 136/86 B |
| 5,252,410 A | 10/1993 | Wilkinson | 429/33 |
| 5,364,711 A | 11/1994 | Yamada | 429/15 |
| 5,480,738 A | 1/1996 | Elangovan | 429/32 |
| 5,508,128 A | 4/1996 | Akagi | 429/30 |
| 5,631,099 A | 5/1997 | Hockaday | 429/30 |
| 5,672,439 A | 9/1997 | Wilkinson | 429/40 |
| 5,759,712 A | 6/1998 | Hockaday | 429/30 |
| 5,861,221 A | 1/1999 | Ledjeff | 429/32 |
| 5,925,477 A | 7/1999 | Ledjeff | 429/32 |
| 5,989,741 A | 11/1999 | Bloomfield | 429/32 |
| 6,060,188 A | 5/2000 | Muthuswamy | 429/31 |
| 6,127,058 A | 10/2000 | Pratt | 429/30 |
| 6,387,557 B1 | 5/2002 | Krasij | 429/32 |
| 6,620,542 B1 | 9/2003 | Pan | 429/41 |
| 6,740,444 B1 | 5/2004 | Leban | 429/41 |
| 6,830,736 B1 * | 12/2004 | Lamla et al. | 422/211 |

FOREIGN PATENT DOCUMENTS

CA   2 273 316   11/1999

(Continued)

OTHER PUBLICATIONS

Wainwright, et al. "A Microfabricated Hydrogen/Air Fuel Cell" 195 Meeting of the Electrochemical Society, Seattle, WA, 1999.

*Primary Examiner*—Glenn Caldarola
*Assistant Examiner*—Alexis Wachtel
(74) *Attorney, Agent, or Firm*—Buskop Law Group, P.C.; Wendy Buskop

(57) ABSTRACT

The compact chemical reactor with a central axis includes at least two unit reactors disposed adjacent to each other to form front and back sides of the compact chemical reactor; a front and back reactant plenum communicating with the front and back side respectively; at least one of the plenums comprises a reactant; and unit reactors comprising: a front cavity between front and back process layers; a back cavity between back and front process layers of adjacent unit reactors; the process layers facilitate transport processes between reactant plenums; each cavity communicates with one side of the compact chemical reactor; a front and back perimeter barrier on the back and front process layers respectfully, substantially surrounding respective cavities. At least one of the unit reactors comprise at least one frame formed from one of the process layers, at least one of the perimeter barriers, and at least one of the cavities.

64 Claims, 14 Drawing Sheets

FOREIGN PATENT DOCUMENTS

| | | |
|---|---|---|
| CA | 2 396 191 | 9/2001 |
| CA | 2 438 733 | 8/2002 |
| CA | 2 484 294 | 11/2003 |
| EP | 0585049 | 8/1993 |
| EP | 0823743 | 8/1997 |
| GB | 2339058 | 1/2000 |
| JP | 8050903 | 2/1996 |
| WO | PCT/US01/11763 | 12/2001 |
| WO | PCT/US02/00063 | 1/2002 |
| WO | PCT/US02/17434 | 6/2002 |

* cited by examiner

COMPACT CHEMICAL REACTOR WITH REACTOR FRAME

FIELD

The present embodiments relate to a compact chemical reactor made of one or more unit reactors, wherein at least one unit reactor has at least one reactor frame.

BACKGROUND

Layered, planar chemical reactors can be used for many tasks. One major problem with the layered planar chemical reactor is that the layers must be held in intimate electrical contact with each other. If the intimate contact does not occur, the internal resistance of the stack increases causing the overall efficiency of the chemical reactor to decrease.

A second problem with the layered planar chemical reactors is that larger surface areas increase the difficultly of maintaining consistent contact with the inner recesses of the layered planar chemical reactor.

Since both reactants are required to flow within the plane of the layered planar chemical reactor, at least four and up to six distinct layers have been required to form a workable cell. These layers are usually manufactured into two separate chemical reactors components. A chemical reactor stack is, then, formed by bringing layers into contact with each other. In forming the chemical reactor stack by contacting the layers, reactant flow must be allowed within the layers, but reactants must not be allowed to leak from the assembled chemical reactor stack. The assembled stack usually has to be clamped together with significant force in order to activate perimeter seals and reduce losses associated with transport processes inherent in the reaction. Compressing layers together using brute force is inefficient and expensive.

A need has existed for a small compact chemical reactor capable of low cost manufacturing with fewer parts than the layered planar structure chemical reactor.

A need has existed for a compact chemical reactor with frames capable of being scaled to micro-dimensions, to reduce leakage and manufacturing costs.

A need has existed for a chemical reactor without the external components for connecting the unit reactors together. A need has existed for a compact chemical reactor with high aspect ratio cavities.

A need has existed for a chemical reactor topology or a chemical reactor architecture that allows increased active areas to be included in the same volume, i.e. higher density of active areas. The present embodiments meet these needs.

SUMMARY

The compact chemical reactor with a central axis has at least a first unit reactor and a second unit reactor. The first and second unit reactors are disposed adjacent each other to form a front side and a back side of the compact chemical reactor. The reactor also includes a front reactant plenum communicating with the front side and a back reactant plenum communicating with the back side. At least one of the reactant plenums comprises a reactant.

The unit reactors comprise a front process layer, a back process layer, a front cavity formed between the front and back process layers, a back cavity formed between the back process layers and the front process layer of adjacent unit reactors, a front perimeter barrier disposed on the back process layer substantially surrounding the back cavity; and a back perimeter barrier disposed on the front process layer substantially surrounding the front cavity. The front cavity is in communication with the front side and the back cavity is in communication with the back side and wherein at least one of process layers facilitates a transport process between the reactant plenums. At least one of the unit reactors comprise at least one frame formed from one of the process layers, at least one of the perimeter barriers, and at least one of the cavities. Each cavity is in communication with one side of the compact chemical reactor and the process layer facilitates a transport process between the reactant plenums.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The benefits of the current compact chemical reactor include providing increased reactant surface areas as compared to other compact chemical reactors. The compact chemical reactor also provides an ability to scale a compact chemical reactor to micro-dimensions and create microreactors.

The compact chemical reactor was designed to enable users to scale up the compact chemical reactor to larger sizes without the need for external components to hold the compact chemical reactor together.

The use of frames in the compact chemical reactor simplifies the overall design, reduces the number of components needed in construction which simplifies the construction steps needed to make the device. The frame construction also increases the precision of alignment between process layers and perimeter barriers used in the unit reactors.

When composite frames are used, the frame based design simplifies the task of sealing layers by only having to bond similar materials to each other.

Figure 1:
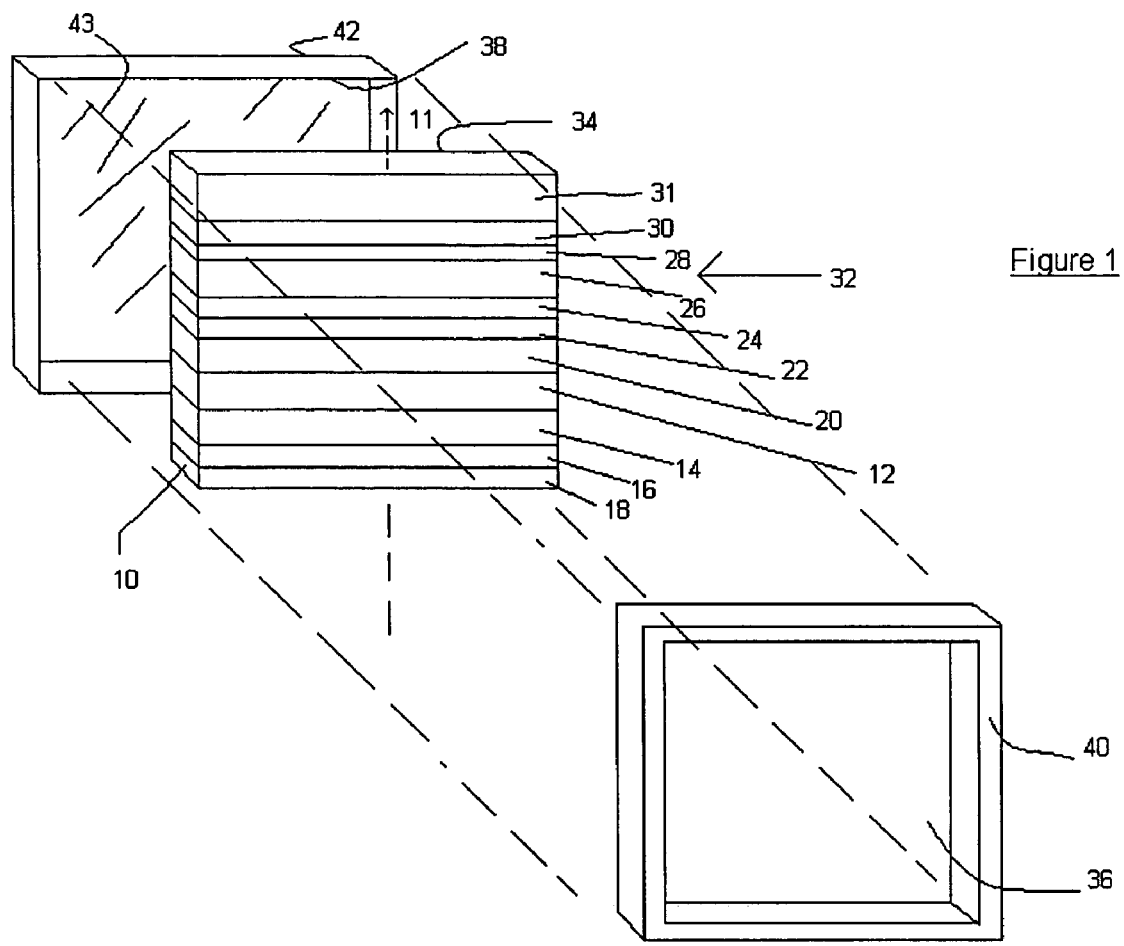
FIG. 1 depicts a perspective view of a flat construction of a chemical reactor with frames.

With reference to the figures, FIG. 1 depicts a perspective view of a flat construction of a chemical reactor (10) with unit reactors constructed using frames.

Figure 2:
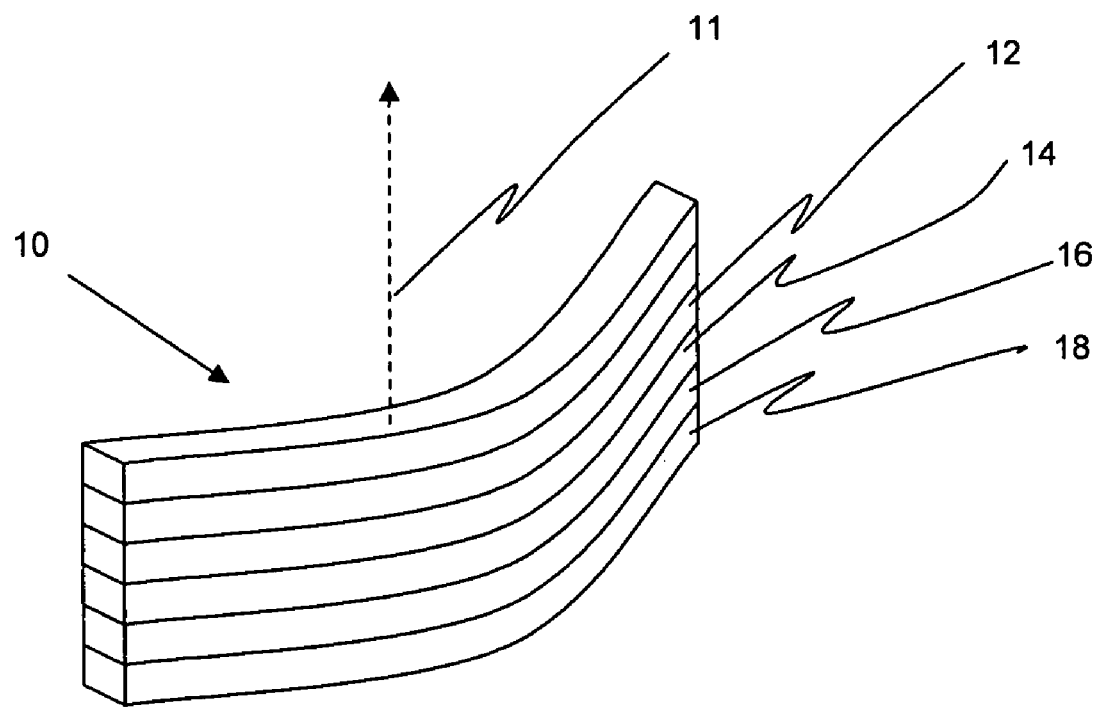
FIG. 2 depicts a thin curvilinear embodiment of FIG. 1.

FIG. 2 depicts a thin curvilinear embodiment of the compact chemical reactor (10). Throughout the figures, the compact chemical reactor (10) is depicted having a central axis (11).

FIG. 1 shows ten unit reactors assembled together having an overall dimension of between about 1 centimeter and 10 centimeters in length, between about 5 millimeters and 80 millimeters in width, and between about 100 nanometers and 4 millimeters in thickness. Each unit reactor, as depicted, has two process layers.

Other shapes besides a cylindrical shape can be used. As an alternative to embodiments depicted in FIG. 1 and FIG. 2, the compact chemical reactor (10) can be a rectangle, a square, a triangle, an octagon, a pentagon, other prismatic shapes, or another irregular shapes.

The compact reactor (10) can have a variable thickness. Variable thickness can mean that one individual unit reactor can be thicker than an adjacent unit reactor.

FIG. 1 in particular shows a compact chemical reactor with eleven unit reactors connected together. In particular, FIG. 1 depicts the first unit reactor (12), a second unit reactor (14) and nine other unit reactors (16, 18, 20, 22, 24, 26, 28, 30, and 31).

The first and second unit reactors are disposed adjacent to each other and form a front side (32) and a back side (34) of the compact chemical reactor. The front side (32) communicates with front reactant plenum (36) and the back side (34) communicates with back reactant plenum (38). The unit reactors can be oriented to form the back reactant plenum (38).

In the embodiment depicted in FIG. 1, the unit reactors are disposed roughly parallel to each other and then the unit reactors are disposed horizontally around the central axis (11).

The front reactant plenum (36) is enclosed by a structure (40). The structure can either be a closed container or open to ambient atmosphere. FIG. 1 depicts an embodiment of the structure (40) open to ambient atmosphere. When the front reactant plenum is open to the atmosphere, the enclosing structure (40) is optional. The structure (40), when open to the atmosphere, adds structural support to the front reactant plenum.

The back reactant plenum (38) is enclosed by a device (42) which is similar to structure (40). The device (42) can be a closed container or open to ambient atmosphere. When the device (42) is open to the atmosphere, it adds structural support to the back reactant plenum. FIG. 1 depicts an embodiment wherein the device (42) is a closed container with a solid back wall (43).

The compact chemical reactor (10) is constructed of a plurality of unit reactors. The design of the compact chemical reactor (10) can range from 2 unit reactors to 50,000 or more unit reactors to be adjoined to create the compact chemical reactor. Preferably, between 2 unit reactors and 500 unit reactors are used in the compact chemical reactor with a preferred embodiment of between 2 unit reactors and 100 unit reactors.

Figure 3:
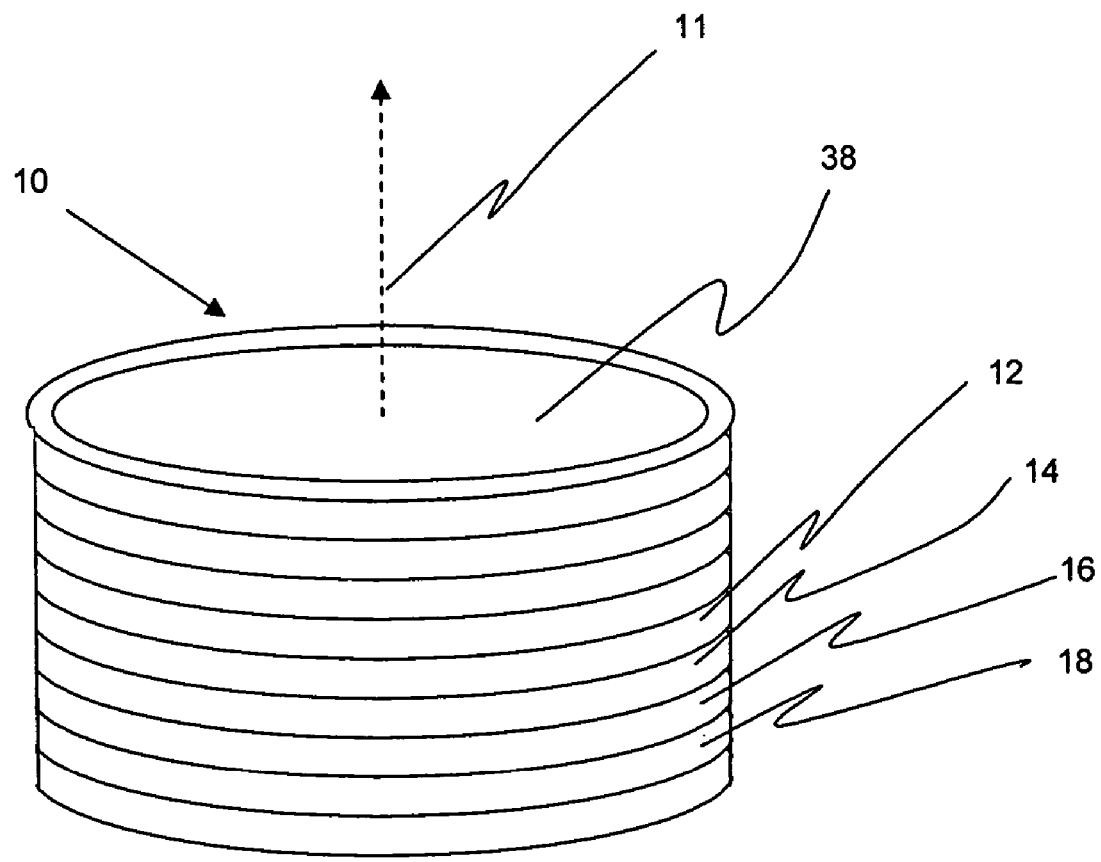
FIG. 3 depicts a view of a chemical reactor with unit reactors perpendicular to the reactors central axis.

FIG. 3 depicts an embodiment where at least one unit reactor (12) is perpendicular to the central axis (11) of the compact chemical reactor (10).

Figure 4:
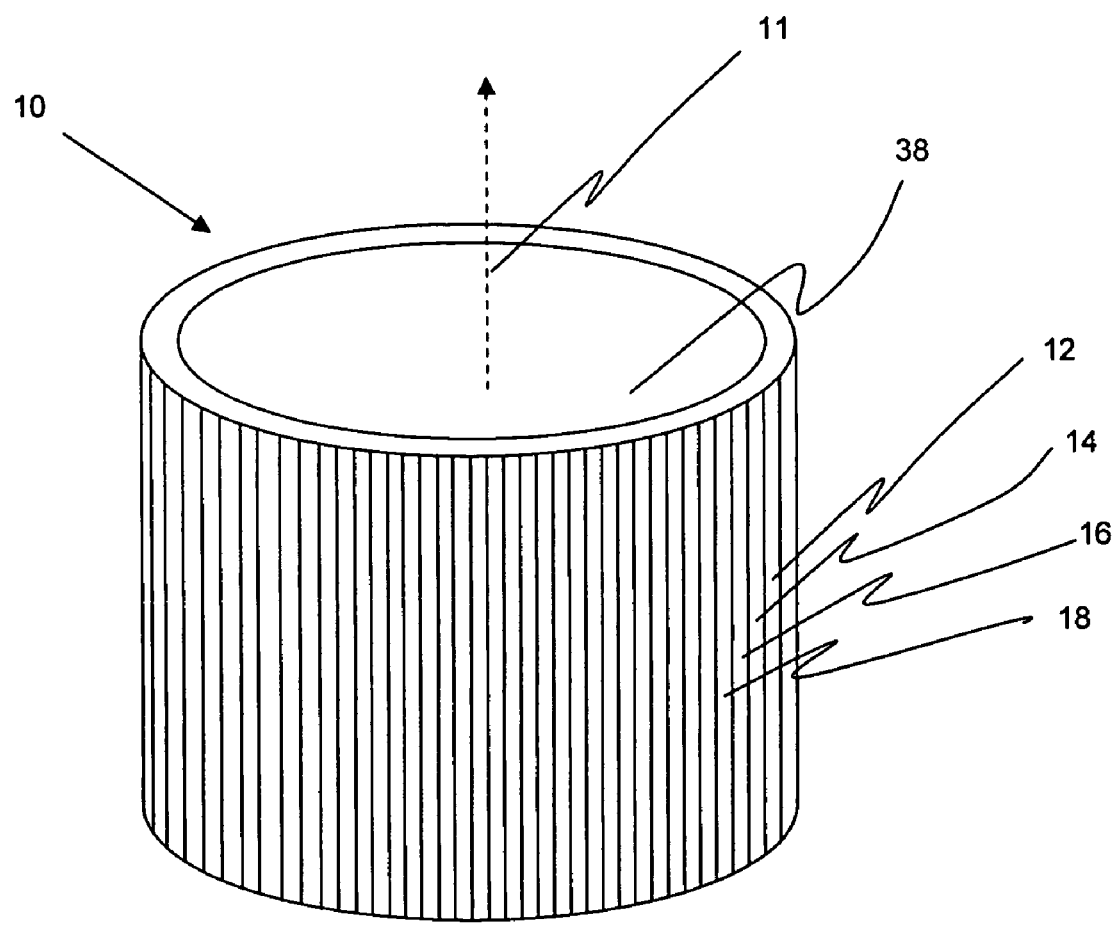
FIG. 4 depicts a cylindrical version of FIG. 1.

FIG. 4 depicts an embodiment wherein at least one unit reactor encloses the back reactant plenum (38) and the unit reactors are disposed roughly parallel to each other and then the unit reactors are disposed parallel around the central axis (11).

An alternative embodiment contemplates the unit reactors disposed parallel to each other orthogonal around the central axis.

Figure 5:
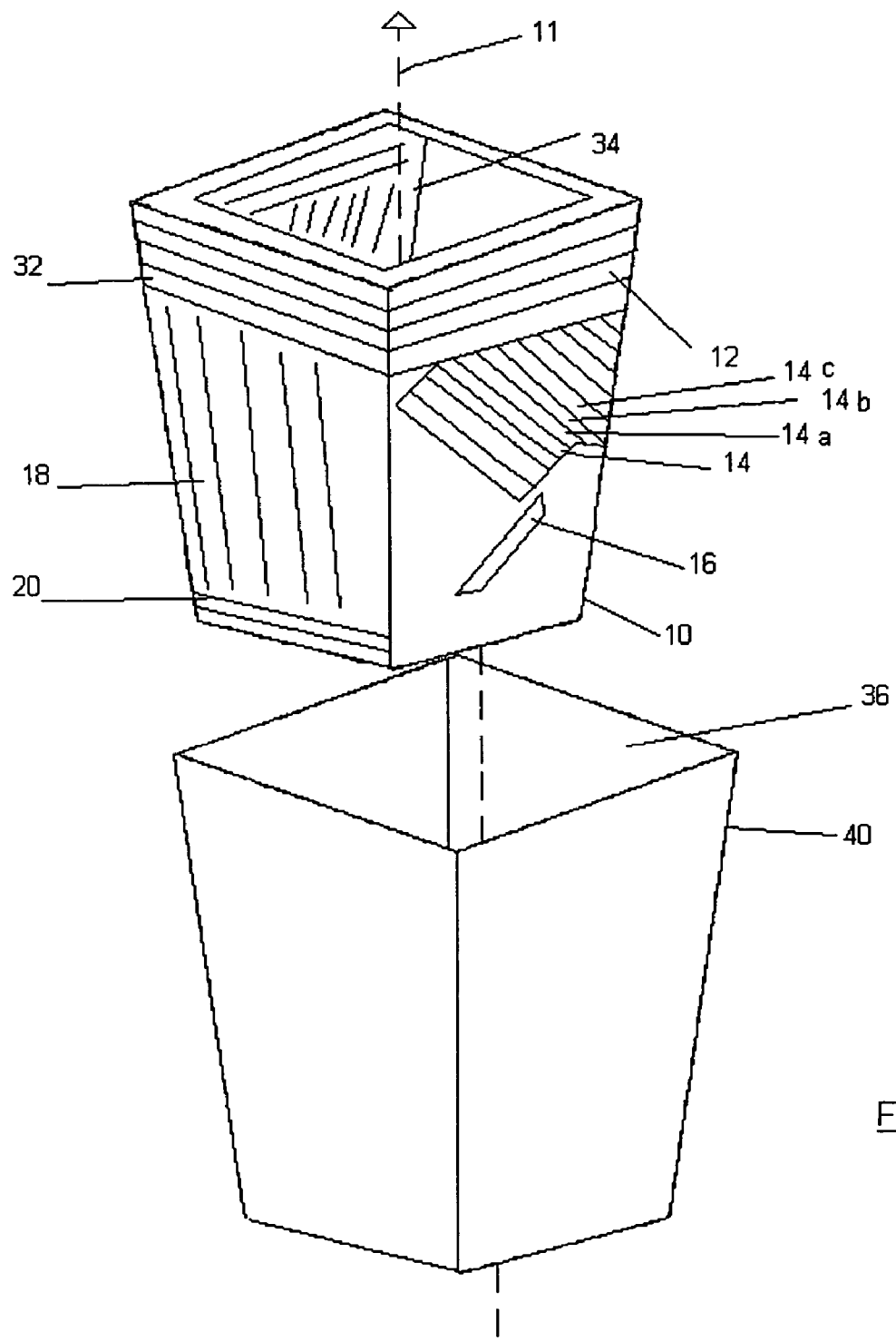
FIG. 5 depicts a view of the chemical reactor of FIG. 1 with unit reactors at angles arbitrary to other unit reactors.

FIG. 5 depicts an embodiment wherein the unit reactors (12, 14, 16, and 18) are disposed roughly parallel to each other but at an arbitrary angle to the central axis (11) of the compact chemical reactor (10). The unit reactors can be disposed in groups wherein the unit reactors are parallel to each other, and then each group can be disposed at an arbitrary angle to adjacent groups.

Figure 6:
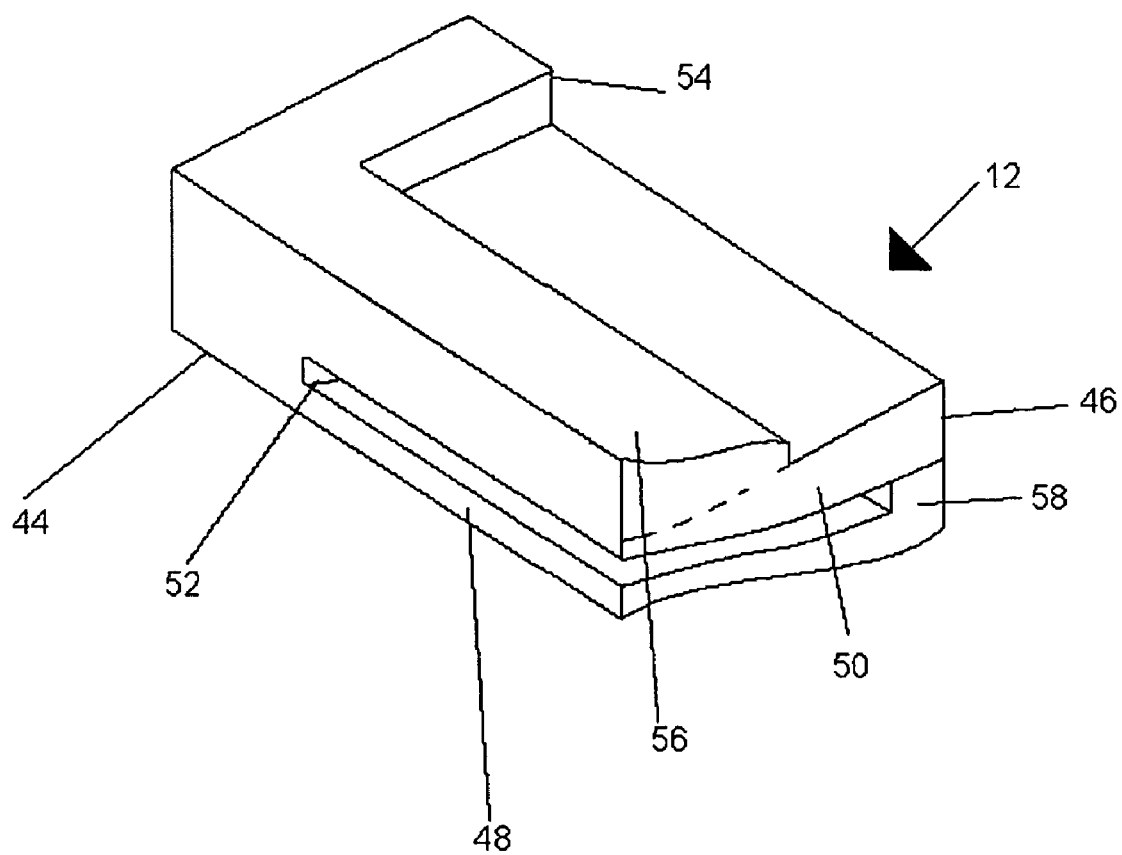
FIG. 6 depicts an individual unit reactor.

FIG. 6 depicts a cutaway perspective view of one embodiment of an individual unit reactor (12). The unit reactor has a front face (44) and a back face (46). The unit reactor comprises a front process layer (48), referred to herein as a first process layer, and a back process layer (50), referred to herein as a second process layer. The process layers (48 and 50) are shown in this embodiment as thin sheets with each process layer having, preferably, a thickness between about 1 nanometer to about 2 centimeters. As an alternative, the one or more of the process layers can have a thickness different from another process layer.

The thin sheets can be made from one of a variety of materials. For example, process layer material could be an electrolyte, an ion exchange membrane, a filtration membrane, a separation membrane, a micro-structured diffusion mixer, a heater, a catalyst, an electrical conductor, a thermal conductor, and combinations of these. For example, a workable ion exchange membrane would be Nafion™ available from E.I. DuPont DeNamours of Wilmington, Del.

Another usable separation membrane is Nafion™. A micro-structured diffusion mixer is available from Micronics of Seattle, Wash., and typically serves to allow transport of liquid from one cavity to another by diffusion without use of a separation membrane. Micro-structured diffusion mixers have small channels, and when liquid is pushed through the channels, there is a laminar flow. Typically, the micro-structured diffusion mixers are used for blood testing to prevent the mixing of blood with the test liquid but permit diffusion from one liquid to another.

A type of heater usable with the reactors is a thin film resistive heater, such as those available from Omega of Stamford, Conn. Catalysts that are contemplated as useable include inorganic carbon catalysts, such as Novacarb™ from Mast Carbon of the United Kingdom. An electrical conductor that is contemplated for use in the reactors would be a thin film of metal, such as copper or a silver filled epoxy such as model number TF12202 of Tech Film of Peabody, Mass.

Usable thermal conductors can be metals, such as thermally conductive epoxy adhesive films such as those also available from Tech Film.

Alternatively, each process layer can be made of a filled metal composite, a filled microstructure of polymer, filled epoxy composite, graphite composite, or combinations of these materials. Filled metal composites would be a stainless steel filled with carbon, such as those available from Angstrom Power Inc. of Vancouver, Canada. Filled microstructures of polymers include Primea™ membrane available from Gore Industries of Elkton, Md. Filled epoxy composites include those available from Tech Film of Peabody, Mass. Graphite composites include Grafoil™ available from Graftek from Wilmington, Del.

The compact chemical reactor can have a first process layer that performs a different process from the second process layer.

FIG. 6 shows each individual unit reactor having a front cavity (52) and a back cavity (54). The cavities (52 and 54) are formed between the front and back process layers (48 and 50). Each individual unit reactor includes a front perimeter barrier (56) and a back perimeter barrier (58). The front perimeter barrier (56) is located on the back process layer (50) substantially surrounding the back cavity (54). The front perimeter barrier (56) can optionally completely enclose the back cavity (54). Likewise, the back perimeter barrier (58) can be located on the front process layer (48) substantially surrounding the front cavity (52). The back perimeter barrier (58) can optionally completely enclose the front cavity (52).

The perimeter barriers ensure that reactant from one reactant plenum which connects to one of the cavities, does not migrate into another reactant plenum that connects to the other cavity.

The perimeter barriers keep the reactant from migrating by either the material itself or the form of the perimeter barrier, or both form and material. Usable materials for the perimeter barriers can include metals, such as stainless steel; silicone, such as RTV™ available from Dow Corning of Midland, Mich.; rubber, such as those available from the Apple Rubber of Lancaster, N.Y.; polyamide, such as nylon available from DuPont of Wilmington, Del.; synthetic rubber, such as BUNA available from Dow Synthetic Rubber of Edegem Belgium; epoxy, such as those available from EPO Tech of Billerica, Mass.; polytetrafluoroethylene, also available as Teflon™; polyvinyldiflouride, known as Kynar™, available from Atofina Chemicals, Incorporated, of Philadelphia, Pa.; or composites thereof, laminates thereof, alloys thereof, and/or blends of these materials.

Usable forms for the perimeter barriers include microstructures or three-dimensional structures that create a tortuous path for the reactant.

The formed first and second cavities (52 and 54) allow the reactants to move from the plenums to the process layers. In a preferred embodiment, the only transport mechanism for the movement of reactants within the cavities is by diffusion. In an alternative embodiment, the diffusion can be aided by other transport mechanisms including convection and forced flow. The cavities can be filled with material or structured to aid in the distribution of reactants to the process layers. One or more of the cavities can be filled partially, or completely filled, with a material to aid in the transport of reactant, by-product of the reaction caused by the reactants, or transport of attributes of the reactant. The cavity can be filled with a catalyst to promote the function of the compact chemical reactor. A porous media, such as those available from Angstrom Power of Vancouver, Canada, can be used to partially or completely fill the cavities. In a preferred embodiment, the cavity is filled 100% with the porous media. The cavity can be filled with as little as 5% the porous media.

The transport process is the exchange of a reactant or property of a reactant between the reactant plenums. Examples of usable reactants include fuels, water, oxidants, beverages, liquid phase hydrocarbons, gas phase hydrocarbons, foodstuffs, by-products of the reaction and combinations of these materials. Fuels that could be used include hydrogen, hydrogen from reformate, ammonia, sodium borohydride or other chemical hydrides. Oxidants that could be used include oxygen, air, or means of generating oxygen such as hydrogen peroxide. Beverages that could be used as reactants include wine, juices, and other liquids with particulate. Liquid phase hydrocarbons that can serve as reactants include methanol, ethanol, butanol, and formic acid. Gas phase hydrocarbons include propane, butane, methane, and combinations of these. Foodstuffs that are usable include the whey of cheese products, chocolates based liquids, and other foodstuffs which are initially liquid and then solidify.

The transport process can move reactants and attributes of one of the reactants from one of the reactant plenums to the other reactant plenum.

Attributes within the scope of this application are the attributes of the reactant and include ionic charge (when used as a fuel cell), heat (when used as a heat exchanger), moisture content (when used as a humidifier), pressure (when used with a gas permeable membrane to allow gas to diffuse out of a liquid), concentration (when used to transport material from a substance having a first concentration to a substance with a different concentration), electrical charge, and other similar physical characteristics.

For example, the chemical reactor can move large amounts of heat from a first reactant plenum to a second reactant plenum. If this reactor is made as a heat exchanger having hot water at about 90 degrees Celsius on one side and cold water at about 20 degrees Celsius on the other side, the reactor can quickly perform a thermal transfer of hot into cold in a short time.

When used as a fuel cell, fuel is filled in one reactant plenum and oxidant in the other. The fuel and oxidant are able to be transported to be in contact with the process layers. The process layers have anodes and cathodes by filling the cavities with electrochemically active materials. Electricity is produced by the fuel cell reactant and is transported out of the fuel cell through conductive paths in the layer structure. Water and heat are produced as bi-products of the reaction. The water is transported out of the cavities back into the reactant plenum and heat dissipates through the physical structure.

When used as an electrolyzer, anodes and cathodes are formed on either side of some of the process layers by at least partially filling the cavities with electrochemically active materials. Water is used to fill reactant plenums and is transported into the electrolyzer to come into contact with the anodes and cathodes at the process layers. The electrolysis reaction uses electrical energy to decompose water into water's constituent elemental components, i.e. hydrogen and oxygen. The constituent elemental components are formed at the electrodes and then are transported back into the reactant plenums by convection, diffusion, pressure gradients or a variety of other transport processes.

The compact chemical reactor can be formed in to a micro-structured fuel cell layer or a micro-structured electrolyzer layer.

A typical compact chemical reactor has an overall length between about 1 centimeter and about 100 centimeters; a preferred example is between 1 centimeter and 10 centimeters. An overall width of the chemical reactor is between 1 millimeter and 50 centimeters, with a preferred example being between 5 millimeters and 80 millimeters. An overall thickness between the front face and the back face of the compact chemical reactor is between about 100 nanometers and about 5 centimeters.

The compact chemical reactor provides high surface area process layers which are in communication with the reactant plenums through the front or back cavities. The front or back cavities have high aspect ratio's, wherein the distance from the front or back face to the opposite side of the cavity is much larger than the height of the front or back perimeter barrier.

The reactor preferably has an aspect ratio of at least one cavity>1 cm/cm, more preferably between 1 cm/cm and 100 cm/cm, and most preferably between 2.5 cm/cm and 15 cm/cm.

In operation reactants move from the reactant plenums into the front or back cavities of the unit reactors to come into contact with the process layers. In a preferred embodiment the reactants move in and out of the cavities through diffusion only. In an alternative embodiment, the reactants transport into and out of the cavities is aided by forced convection or by the forced flow through a microstructure embedded within at least one of the front or back cavities.

If the reactor with frames acts as a fuel cell, at least one process layer must be an ionically conductive process layer in order to facilitate the transport of ions. Optionally, at least one process layer may be made an electrically conductive process layer to transport electrons between unit reactors. An ionically conductive process layer can be made from a proton exchange membrane, an electrolyte filled microporous structure, a liquid electrolyte trapped in a mesh, and combinations thereof. An electronically conductive process layer can be made from an electrical conductor, a filled metal composite, a filled micro-structure of polymer, a filled epoxy composite, a graphite composite, or combinations of these materials.

Figure 7:
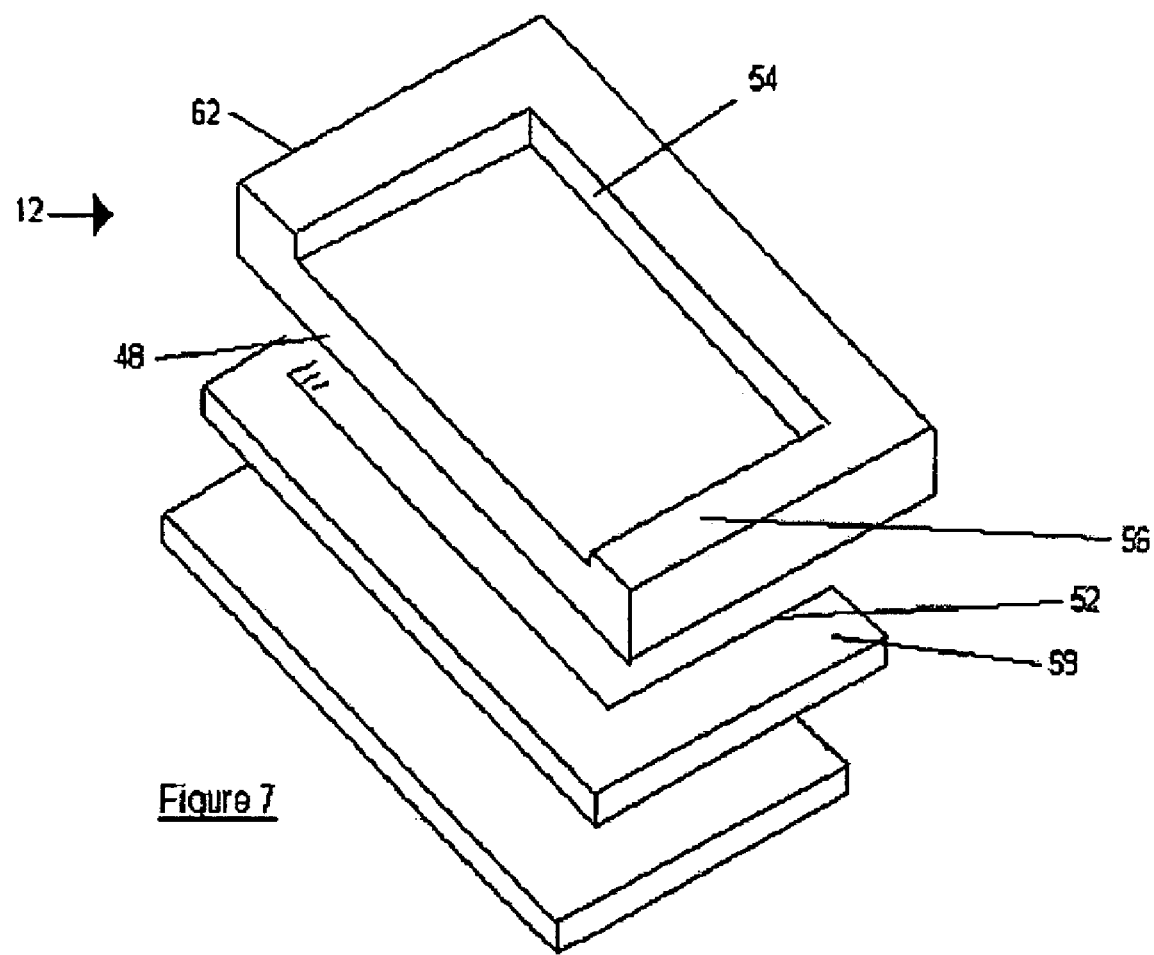
FIG. 7 depicts an exploded perspective view of a unit reactor with one frame.

Each unit reactor can be made of one or more reactor frames (62) as shown in FIG. 7. The frames can be made of one material, so that the frames can function as both a perimeter barrier and as a process material.

The frames that are made from a single material can be made by stamping, embossing, ablating, machining, molding, casting, water jet cutting, or otherwise gouging, or chemically etching. Typical materials are stainless steel; Nafion™, a composite, a metal filled composite, electrolyte filled composites, or combinations of these.

The frames can selectively be made porous and used in conjunction with the reactors.

Preferably, the frames are the same dimension as the components of the unit reactor which they replace. In the case of a compact chemical reactor used as a fuel cell, two types of frames can be used on the fuel cell, an electronically conducting frame and an ionically conducting frame. The electronically conducting frame is made from an electronically conducting material or alternatively, is made conductive by filling a porous region with a nonporous conductive material. The ionically conductive frame is made from an ionic conductor, such as Nafion™ from DuPont, and if Nafion™ is used, then the perimeter barrier if also formed from Nafion™. Alternatively, the frame material can be made from electrically insulating material such as polyethylene with a porous region that has been filled with electrolyte such as Nafion™ to render the region ionically conductive. The frames can be made of identical materials or the frame can each have a different material.

The frames are typically one piece structures to advantageously reduce the number of parts. The one piece construction makes aligning the unit reactors of the compact chemical reactors simpler, which, in turn, makes the process cheaper and quicker than construction using layered materials. By using a one piece formed construction of frames, there is no need for the extra step of bonding dissimilar materials together such as bonding perimeter barrier material to process layer material. Thus a compact chemical reactor built using frames will have better integrity and fewer maintenance issues than multipart constructions.

FIG. 7 depicts an exploded perspective view of a unit reactor with one frame. Frame (62) serving as a process layer (48) and as a perimeter barrier (56) with a formed cavity (54).

Figure 8:
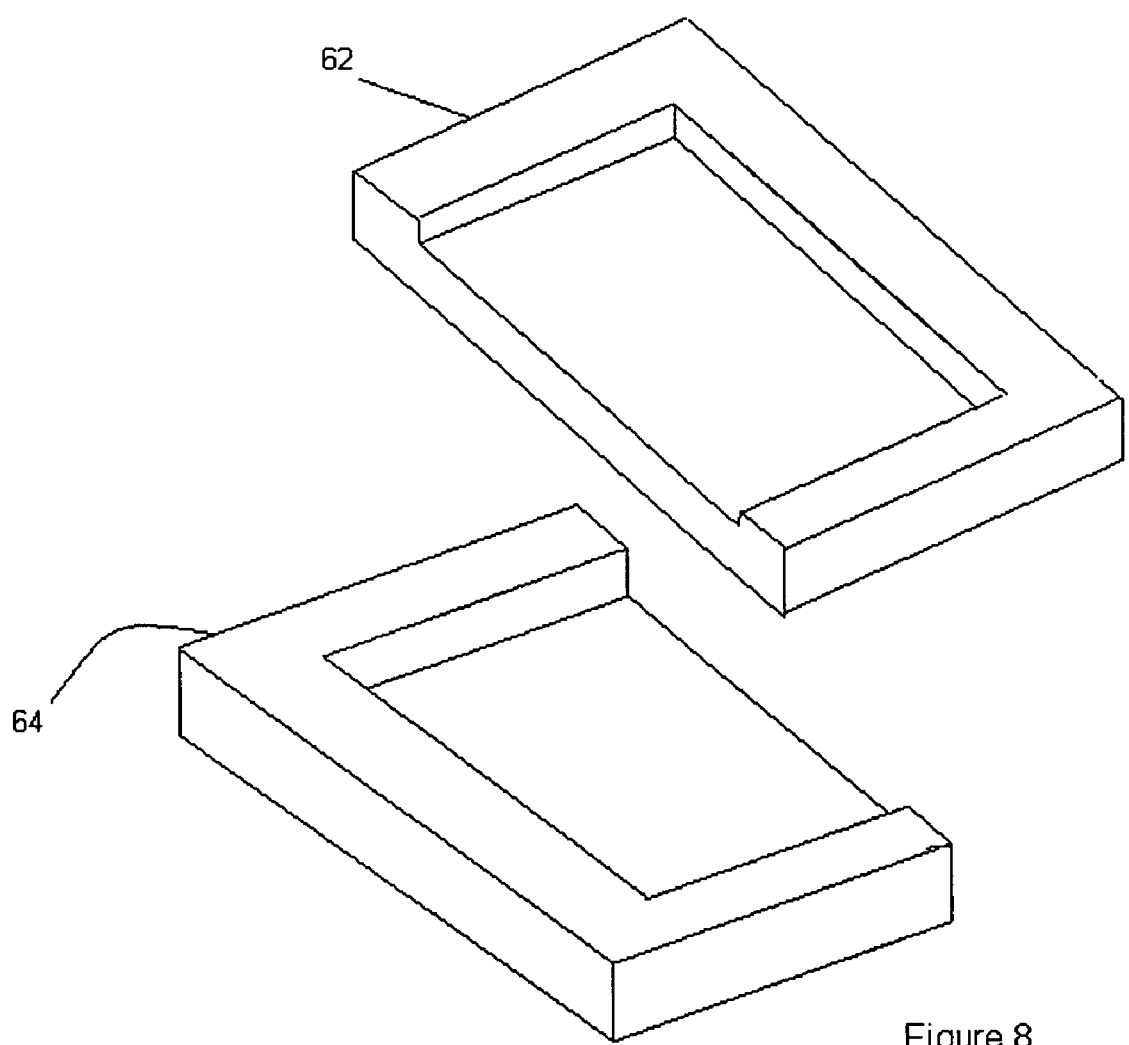
FIG. 8 depicts an exploded perspective view of a unit reactor with two frames.

FIG. 8 depicts an exploded perspective view of a unit reactor constructed from two frames (62 and 64). Each frame serves as a process layer and as a perimeter barrier and contains a formed cavity. The two process layers can have different functions in this embodiment, for example the first process layer can serve to be electrically conductive and the second process layer can serve to be electrically insulating. When used as a fuel cell, at least one frame is preferably made ionically conductive by either forming the frame from an ionic conductor or rendering a portion of a non-conducting frame ionically conductive.

Figure 9:
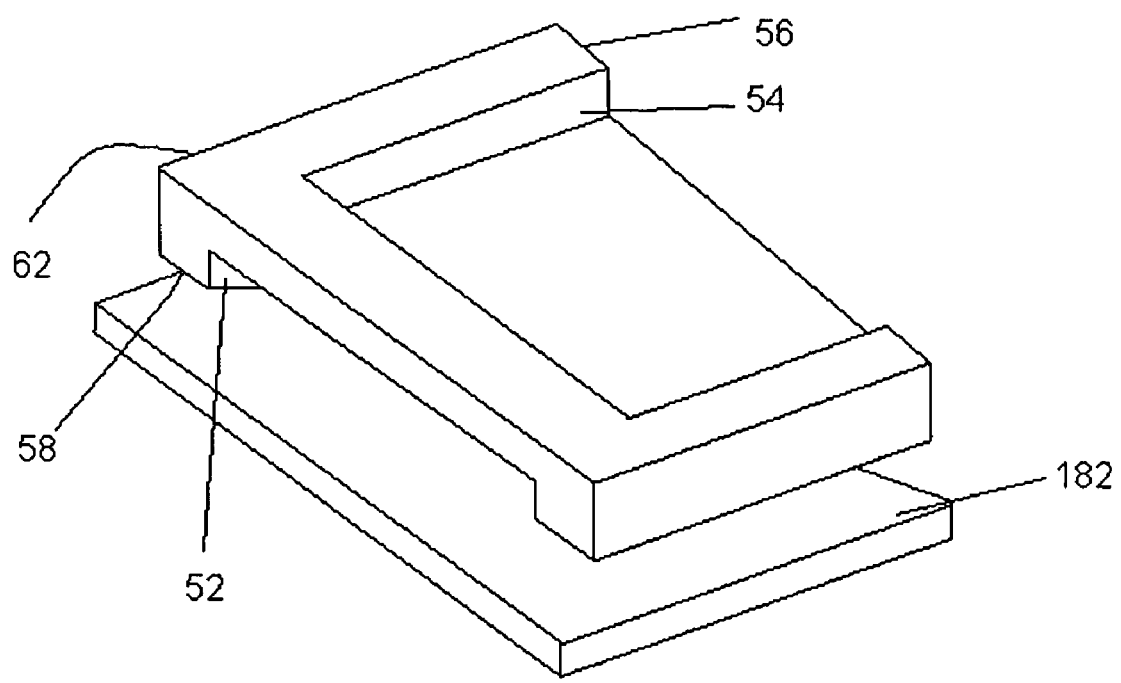
FIG. 9 depicts a unit reactor with a frame and two cavities.

FIG. 9 is a perspective view of a unit reactor with frame (62), a first cavity (52), and a second cavity (54). The cavities are surrounded by integral perimeter barriers (56 and 58). The unit reactor is completed by joining the frame (62) to a second process layer (182).

Figure 10:
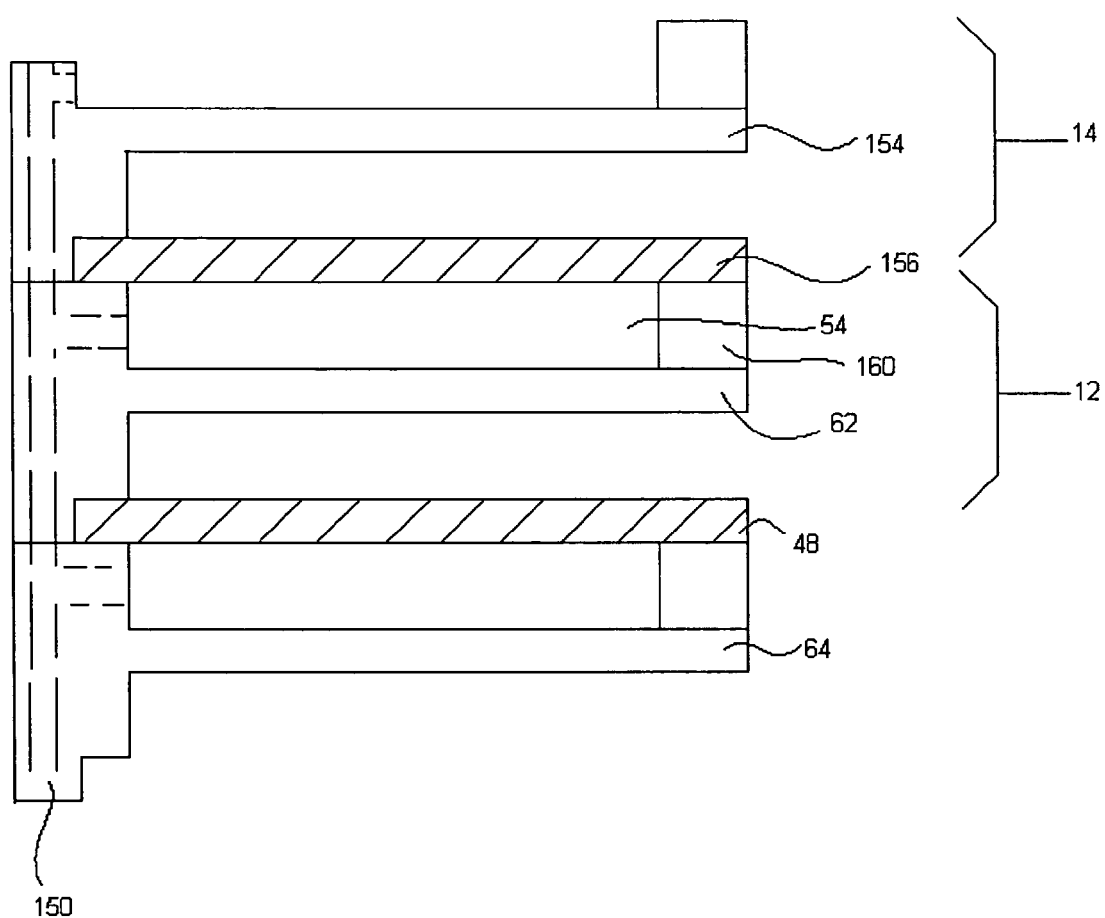
FIG. 10 depicts two unit reactors with an embedded plenum and three frames.

FIG. 10 shows a cross-sectional view of a compact chemical reactor with two unit reactors (12 and 14) and a portion of a reactant plenum (150) embedded in three frames (62, 64, and 154). In this embodiment, the two unit reactors are connected by the frames (62 and 64) and the back perimeter barrier (160). The notion of a common plenum on one side of the compact chemical reactor advantageously enables one reactant to be fed in a controlled manner while the other reactant plenum is open to the environment.

Figure 11:
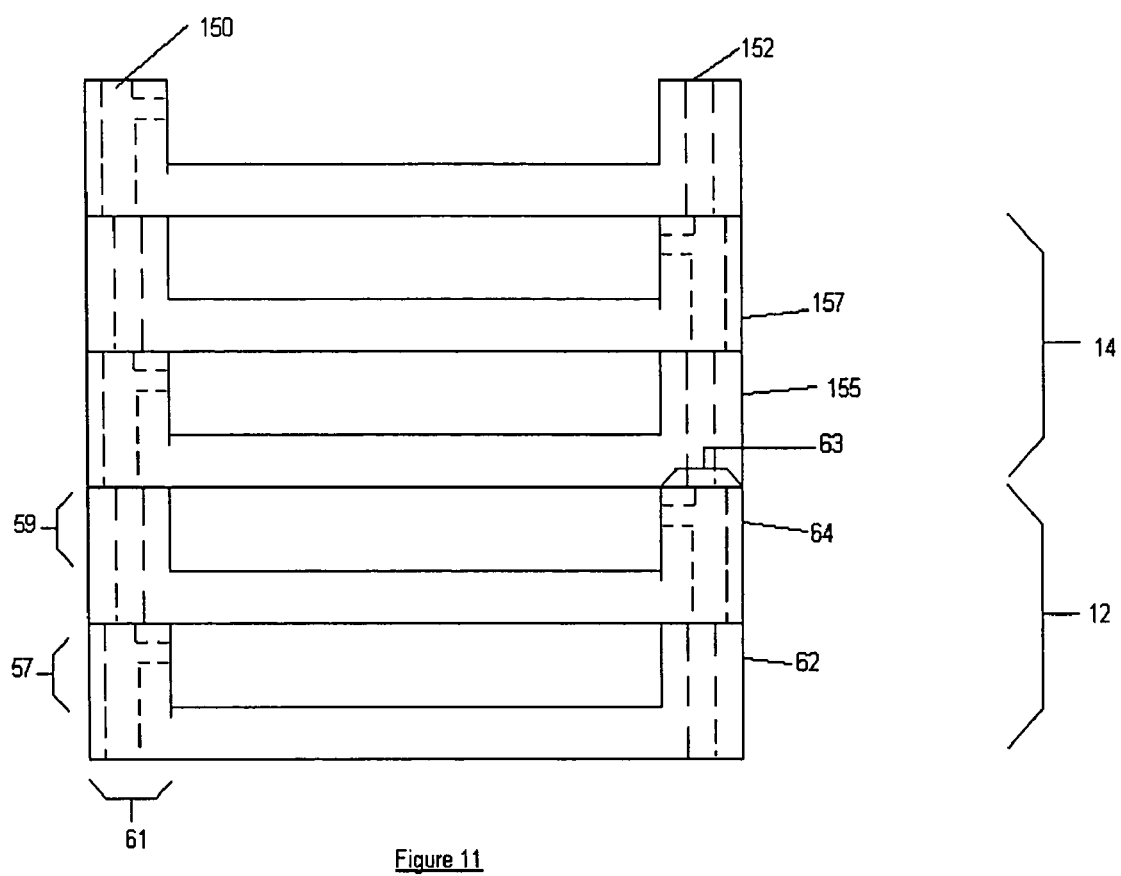
FIG. 11 depicts two unit reactors with two frames.

FIG. 11 shows an embodiment of two unit reactors (12 and 14), each with two reactor frames (62, 64, 155 and 157). The reactor frames can be used to house or embed one or more of the reactant plenums. This figure also depicts a portion of the two reactant plenums (150 and 152) embedded in each reactor frame (62, 64, 155, and 157) similar to FIG. 10.

FIG. 11 also shows that the perimeter barriers used on the process layers of the unit reactors have dimensions of height and width. The front and back perimeter barrier height (57 and 59) respectively have a preferred dimension ranging from about 100 nanometers to about 10 millimeters. The front and back perimeter barrier width (61 and 63) respectively have a preferred dimension ranging from about 10 nanometers to about 5 millimeters. In still another embodiment, the front and back perimeter barrier widths can vary, being less on one portion of the perimeter barrier and greater on another portion of the perimeter barrier.

Figure 12:
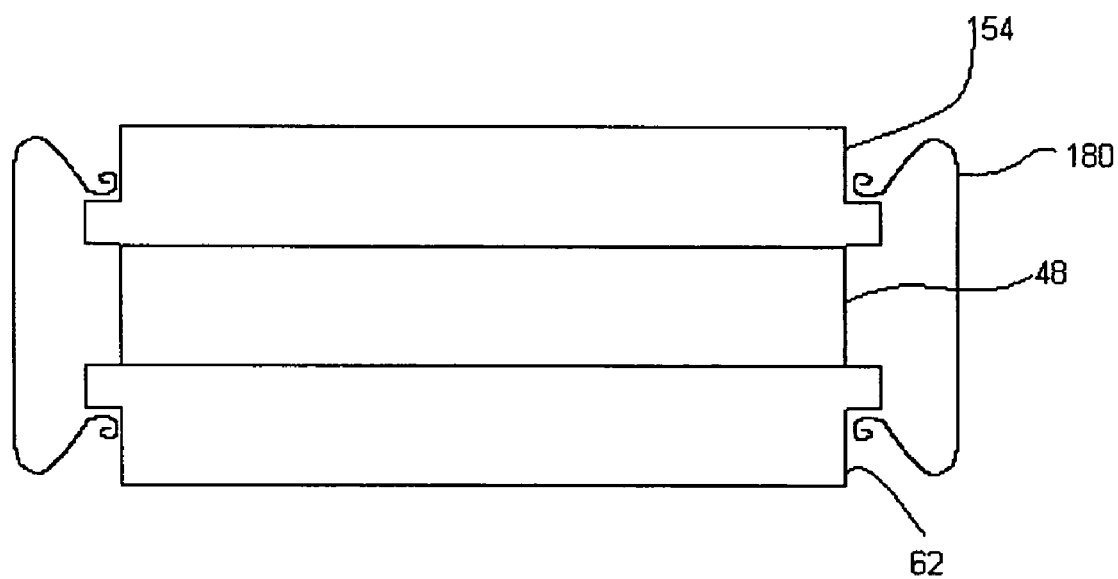
FIG. 12 depicts a view of a reactor frame with mechanical fasteners.

FIG. 12 depicts an exploded perspective view of a reactor frame with a mechanical fastener. Each unit reactor can be formed from two or more reactor frames. FIG. 11 depicts the embodiment of two unit reactors (12 and 14), each with two reactor frames (62, 64, 155 and 157). The reactor frames can be used to house or embed one or more of the reactant plenums.

Examples of mechanical devices usable to connect the unit reactors include snap fit connections, mechanical clips (180) (depicted in FIG. 12), tie rods, adhesive bonds, tape, external compression bands, keys, and combinations of these mechanical devices. The reactor frames can be held together by a protrusion and the corresponding indentation formed from the frame material, or the frame on each unit reactor can be integrally formed to corresponding with another unit reactor.

Figure 13:
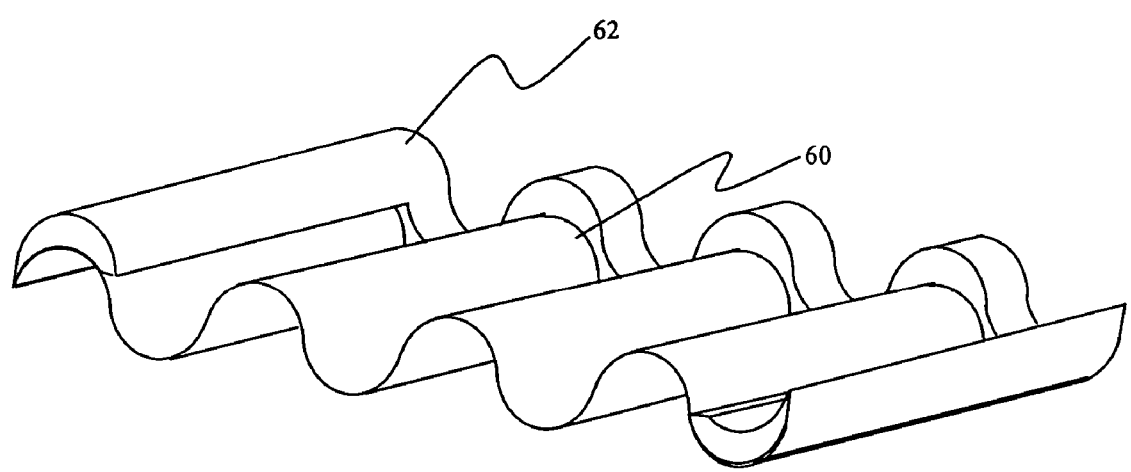
FIG. 13 depicts an undulating reactor with frames.

FIG. 13 shows a frame (62) with an undulating process layer (60). The surface area of the process layer is increased with the undulating construction, thereby increasing the capacity of the compact chemical reactor for the amount of reaction that can be done.

Undulating in the context of this application refers to non-planar process layers, such as layers which are sinusoidal in shape, or arcs, or irregular in some other manner. It is contemplated that some of the process layers can be undulating while remaining process layers can be planar and still form a usable compact chemical reactor.

The compact chemical reactor can be a fuel cell layer formed from multiple unit reactors, each of which is a unit fuel cell with a frame.

Figure 14:
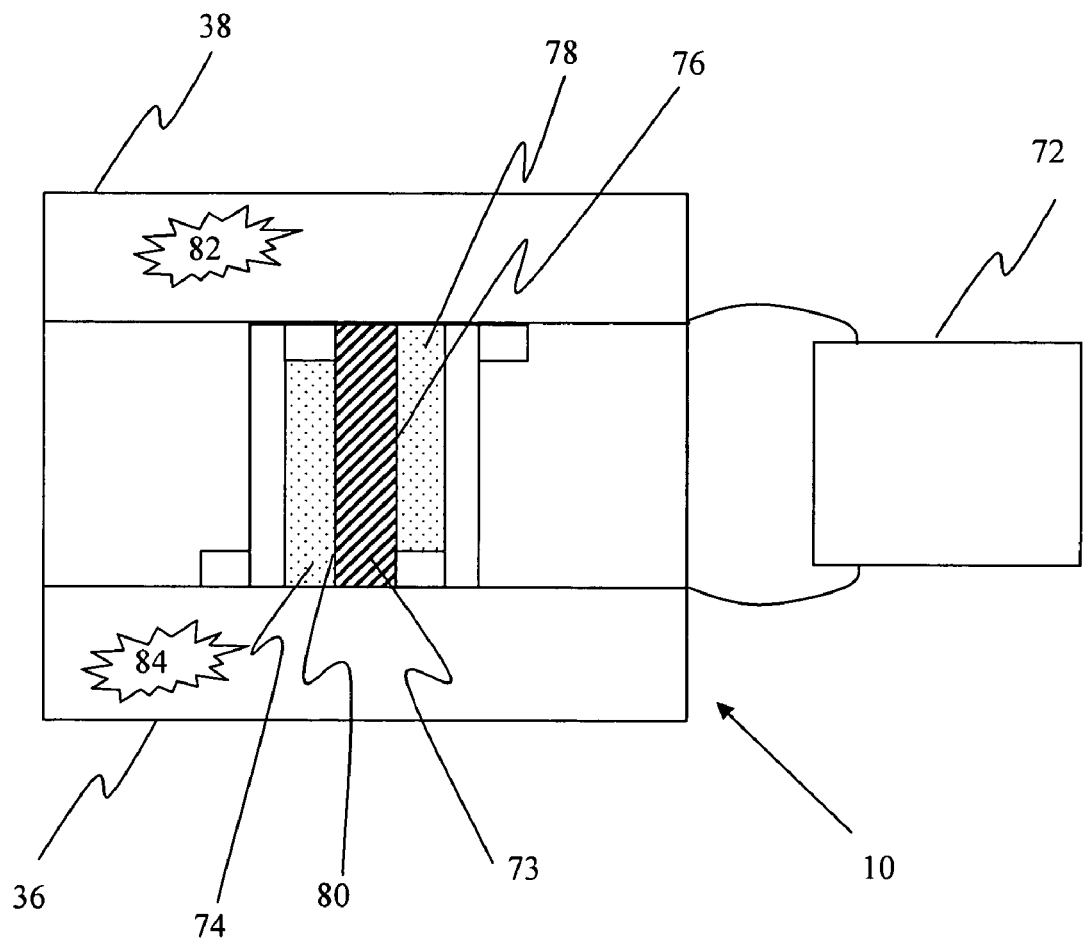
FIG. 14 depicts a compact chemical reactor with an electrical appliance.

FIG. 14 depicts an embodiment wherein the compact chemical reactor (10) is a frame based fuel cell layer is used in conjunction with an electrical appliance (72). The electrical appliance (72) uses the compact chemical reactor (10) as a source of electrical power.

In this embodiment, the unit fuel cell each comprises one or more process layers of electrolyte (73). One or more of the cavities include a first catalyst (74) forming at least one anode (80). One or more other cavities include a second catalyst (78) forming at least one cathode (76). The anode (80) and the cathode (76) are disposed on either side of the electrolyte (73). The frame (62) serves as a separator between unit fuel cells as well as forming the two perimeter barriers (56 and 58).

One of the reactant plenums (38) contains an oxidant (82), such as oxygen, and the other reactant plenums (36) contain a fuel (84), such as hydrogen. The anode (80) and the cathode (76) connect to the electrical appliance and provide power.

The embodiments have been described in detail with particular reference to certain preferred embodiments thereof, but it will be understood that variations and modifications can be effected within the scope of the embodiments, especially to those skilled in the art.

What is claimed is:

1. A compact chemical reactor with a central axis comprising:
    a. at least a first unit reactor and a second unit reactor, wherein the first and second unit reactors are disposed adjacent each other to form a front side and a back side of the compact chemical reactor;
    b. a front reactant plenum communicating with the front side;
    c. a back reactant plenum communicating with the back side, wherein at least one of the reactant plenums comprises a reactant; and
    d. wherein each unit reactors comprises:
        i. a first process layer;
        ii. a second process layer;
        iii. a front cavity formed between the first and second process layers;
        iv. a back cavity formed between the second process layers and the first process layer of adjacent unit reactors;
        v. a front perimeter barrier disposed on the second process layer substantially surrounding the back cavity; and
        vi. a back perimeter barrier disposed on the first process layer substantially surrounding the front cavity and wherein the front cavity is in communication with the front side and the back cavity is in communication with the back side and wherein at least one of process layers facilitates a transport process between the reactant plenums; and wherein at least one of the unit reactors comprise at least one frame formed from one of the process layers, at least one of the perimeter barriers, and at least one of the cavities; and wherein each cavity is in communication with one side of the compact chemical reactor, and wherein the process layer facilitates a transport process between the reactant plenums.

2. The reactor of claim 1, wherein each of the unit reactors comprises a frame formed from one of the process layers, one of the perimeter barriers and one of the cavities.

3. The reactor of claim 1, wherein at least one unit reactor comprises two frames, each frame formed from a process layer, a perimeter barrier and a cavity.

4. The reactor of claim 1, wherein at least one unit reactor comprises a frame formed from one of the process layers, two of the perimeter barriers and two of the cavities.

5. The reactor of claim 1, wherein at least a portion of one of the reactant plenums is embedded in one of the reactor frames.

6. The reactor of claim 2, wherein at least a portion of one of the reactant plenums is embedded in one of the reactor frames.

7. The reactor of claim 3, wherein at least a portion of one of the reactant plenums is embedded in one of the reactor frames.

8. The reactor of claim 4, wherein at least a portion of one of the reactant plenums is embedded in one of the reactor frames.

9. The reactor of claim 2, wherein the frame from a first unit reactor connects to a frame of the second unit reactor with a mechanical device.

10. The reactor of claim 1, further comprising an additional process layer, a second perimeter barrier disposed on the additional process layer, and a second cavity formed in at least one reactor frame adjacent to the at least one reactor frame; and wherein the at least one cavity is in communication with one of the sides of the compact chemical reactor and the second cavity is in communication with the other side of the compact chemical reactor and further wherein at least one of the process layers facilitates a transport process between the reactant plenums.

11. The reactor of claim 1, wherein the frame from a first unit reactor connects to a frame of the second unit reactor with a mechanical device.

12. The reactor of claim 11, wherein the frames are held together by a protrusion and corresponding indentation formed from the frame that provides a snap fit connection, a mechanical clip, a tie rod, an adhesive bond, tape, external compression bands, a key, and combinations therein.

13. The reactor of claim 1, wherein the at least one process layer is held in place by a mechanical device coupling the frame from the first unit reactor to a second frame in a second unit reactor.

14. The reactor of claim 1, wherein the transport process is the exchange of reactant between the reactant plenums.

15. The reactor of claim 1, where the reactant comprises: a fuel, an oxidant, water, hydrogen, oxygen, air, liquid phase hydrocarbons, gas phase hydrocarbons, beverages, foodstuffs, byproducts from reaction of reactants, and combinations thereof.

16. The reactor of claim 1, wherein the transport process moves an attribute of the reactant from one of the reactant plenums to the other reactant plenum.

17. The reactor of claim 16, wherein the attribute is heat, moisture content, pressure, concentration, ionic charge, or electrical charge.

18. The reactor of claim 1, wherein the front perimeter barrier completely encloses the back cavity.

19. The reactor of claim 1, wherein the back perimeter barrier completely encloses the front cavity.

20. The reactor of claim 1, wherein the compact chemical reactor is a thin flat construction.

21. The reactor of claim 1, wherein the compact chemical reactor is thin curvilinear construction.

22. The reactor of claim 1, wherein the unit reactors are disposed parallel to each other orthogonal around the central axis.

23. The reactor of claim 1, wherein the unit reactors are disposed parallel to each other parallel to the central axis.

24. The reactor of claim 1, wherein each unit reactor is disposed at a different angle to the adjacent unit reactor.

25. The reactor of claim 1, wherein the unit reactors are formed into groups of parallel unit reactors and each group is disposed at an arbitrary angle to adjacent groups.

26. The reactor of claim 1, wherein the overall length of the compact chemical reactor is between 1 millimeter and 100 centimeters and the overall width of the compact chemical reactor is between 1 millimeters and 50 centimeters and the overall thickness between the front face and the back face of the compact chemical reactor is between 100 nanometers and 5 centimeters.

27. The reactor of claim 1, wherein the compact chemical reactor has a shape selected from the group consisting of rectangle, square, cylinder, triangle, octagon, pentagon, and irregular shape.

28. The reactor of claim 1, wherein the first and second unit reactors are oriented to form the back reactant plenum.

29. The reactor of claim 1, wherein the front reactant plenum is enclosed by a structure.

30. The reactor of claim 29, wherein the structure is open to ambient atmosphere.

31. The reactor of claim 29, wherein the structure is a closed container.

32. The reactor of claim 1, wherein the back reactant plenum is enclosed by a device.

33. The reactor of claim 32, wherein the device is open to ambient atmosphere.

34. The reactor of claim 32, wherein the device is a closed container.

35. The reactor of claim 1, wherein more than two unit reactors are used in the compact chemical reactor.

36. The reactor of claim 1, wherein between 2 unit reactors and 50,000 unit reactors are used in the compact chemical reactor.

37. The reactor of claim 1, wherein between 2 unit reactors and 500 unit reactors are used in the compact chemical reactor.

38. The reactor of claim 1, wherein between 2 unit reactors and 100 unit reactors are used in the compact chemical reactor.

39. The reactor of claim 1, further comprising a plurality of unit reactors, wherein adjacent unit reactors connect adjacent front perimeter barriers and first process layers.

40. The reactor of claim 1, wherein the process layers comprise an electrolyte, an ion exchange membrane a filtration membrane, a separation membrane, a micro-structured diffusion mixer, a heater, a catalyst, electrical conductors, thermal conductors, and combinations thereof.

41. The reactor of claim 40, wherein the process layers comprise a filled metal composite, a filled microstructure of polymer, a filled epoxy composite, a graphite composite, and combinations thereof.

42. The reactor of claim 1, wherein one of the process layers performs a function different from the function of the other process layer.

43. The reactor of claim 1, wherein at least one cavity is at least partially filled with a material to aid in the transport of reactant or attributes of reactant or byproducts of the reaction.

44. The reactor of claim 1 wherein at least one cavity is at least partially filled with a catalyst to promote the function of the reactor.

45. The reactor of claim 1, wherein the each perimeter barrier comprises a material that prevents reactant from one reactant plenum from moving into the other reactant plenum.

46. The reactor of claim 45, wherein the material comprises a metal, a silicone, a rubber, a polyamide, a synthetic rubber, an epoxy, a polytetrafluoroethylene, a polyvinyldiflouride, composites of thereof, laminates thereof, alloys thereof, and combinations thereof.

47. The reactor of claim 1, wherein each perimeter barrier comprises a structural form that prevents reactant from one reactant plenum from moving into another reactant plenum.

48. The reactor of claim 47, where the structural form can be a microstructure or a three dimensional structure creating a tortuous path.

49. The reactor of claim 1, wherein the process layers comprise at least one thin sheet.

50. The reactor of claim 1, wherein at least one of the process layers has a thickness between 1 nanometer and 2 centimeters.

51. The reactor of claim 1, wherein at least one process layer comprises a thickness different from another process layer.

52. The reactor of claim 1, wherein the transport of reactant from reactant plenum to process layers is by diffusion.

53. The reactor of claim 1, wherein at least one cavity has an aspect ratio greater than 1 cm/cm.

54. The reactor of claim 53, wherein at least one cavity has an aspect ratio between 1 cm/cm and 100 cm/cm.

55. The reactor of claim 53, wherein at least one cavity has an aspect ratio between 2.5 cm/cm and 15 cm/cm.

56. The reactor of claim 1, wherein the front and back perimeter barriers each comprise a height ranging from 100 nanometers to 10 millimeters and a width ranging from 10 nanometers to 5 millimeters.

57. The reactor of claim 1, wherein each front and back perimeter barrier comprise a width which can vary from being less on one portion of the perimeter barrier to greater on another portion of the perimeter barrier.

58. The reactor of claim 1, wherein the first process layer is an undulating first process layer, the second process layer is an undulating second process layer, the front cavity is an undulating front cavity, the back cavity is an undulating back cavity, the front perimeter barrier is an undulating front perimeter barrier, and the back perimeter barrier is an undulating back perimeter barrier.

59. The reactor of claim 1, wherein the compact chemical reactor is a fuel cell comprising a plurality of unit reactors, each comprising at least one process layer of electrolyte, at least one cavity comprises a first catalyst to form an anode contacting the electrolyte, and at least one other cavity comprises a second catalyst to form a cathode contacting the electrolyte, and at least one reactant plenum comprising an oxidant and at least one reactant plenum comprising a fuel.

60. An electrical appliance, comprising as a source of power, the compact chemical reactor of claim 59.

61. The reactor of claim 1, wherein each unit reactor has a frame integrally formed from at least one process layer between at least one perimeter barrier and a second perimeter barrier and disposed on the frame is an additional process layer.

62. The reactor of claim 1, wherein the reactor forms a micro-structured fuel cell layer.

63. The reactor of claim 1, wherein the reactor forms a micro-structured electrolyzer layer.

64. The reactor of claim 1, wherein a process layer is formed from two or more thin process layers that are placed in contact with each other.

* * * * *

UNITED STATES PATENT AND TRADEMARK OFFICE
CERTIFICATE OF CORRECTION

| | |
|---|---|
| PATENT NO. | : 7,063,910 B2 |
| APPLICATION NO. | : 10/818610 |
| DATED | : June 20, 2006 |
| INVENTOR(S) | : Gerard Francis McLean, Duhane Lam and Olen Richard Vanderleeden |

It is certified that error appears in the above-identified patent and that said Letters Patent is hereby corrected as shown below:

On Title page

Abstract; item 57 change "front and back process layers" to --first and second process layers--

Abstract; item 57 change "back and front process layers" to --second and first process layers--

Abstract; item 57 change "back and front process layers" to --first and second process layers--

Column 1, Line 19, change "difficultly" to --difficulty--

Column 1, Line 64, change "process layers" to --process layer--

Column 1, Line 64, change "adjacent unit reactors" to --an adjacent unit reactor--

Column 2, Line 4, insert --the-- between "of" and "process"

Column 2, Line 33, insert --, each-- between "reactor" and "with"

Column 2, Line 36, change "frames" to --a frame--

Column 3, Line 8, change "ten" to --eleven--

Column 3, Line 15, change "FIG 1 and FIG 2" to --Figures 1-4--

Column 3, Line 18, change "another" to --other--

Column 4, Line 21, change "between" to --from--

Column 4, Line 23, change "As an alternative, the one or more of the process layers can have a thickness different from another process layer." to --The process layers within a unit reactor can be of the same thickness or can have different thicknesses.--

Column 4, Line 30, change "and" to --or--

UNITED STATES PATENT AND TRADEMARK OFFICE
CERTIFICATE OF CORRECTION

PATENT NO. : 7,063,910 B2
APPLICATION NO. : 10/818610
DATED : June 20, 2006
INVENTOR(S) : Gerard Francis McLean, Duhane Lam and Olen Richard Vanderleeden It is certified that error appears in the above-identified patent and that said Letters Patent is hereby corrected as shown below:

Column 4, Line 65, change "Graftek from" to --Graftek of--

Column 5, Line 6, change "front and back" to --first and second--

Column 5, Line 9, change "back process layer" to --second process layer--

Column 5, Line 13, change "front process layer" to --first process layer--

Column 5, Line 38, insert --to prevent the leakage of one reactant into the other reactant plenum-- between "reactant" and "."

Column 7, Line 12, change "reactants" to --reactants'--

Column 7, Line 23, change "and" to --or--

Column 7, Line 39, change "The frames can selectively be made porous and used in conjunction with the reactors." to --The active area of the frames can be selectively made porous.--

Column 7, Line 44, change "on" to --in--

Column 7, Line 57, change "frame" to --frames--

Column 8, Line 4, change "serving" to --serves--

Column 8, Line 27, change "62 and 64" to --62 and 154--

Column 8, Line 50, remove " an exploded perspective view of"

Column 8, Line 52, remove "FIG. 11 depicts the embodiment of two unit reactors (12 and 14), each with two reactor frames (62, 64, 155 and 157). The reactor frames can be used to house or embed one or more of the reactant plenums."

Column 8, Line 64, change "corresponding" to --correspond--

Column 9, Line 3, change "the capacity of the compact chemical reactor for the amount of reaction that can be done." to --the reaction capacity of the compact chemical reactor.--

UNITED STATES PATENT AND TRADEMARK OFFICE
CERTIFICATE OF CORRECTION

| | | |
|---|---|---|
| PATENT NO. | : 7,063,910 B2 | |
| APPLICATION NO. | : 10/818610 | |
| DATED | : June 20, 2006 | |
| INVENTOR(S) | : Gerard Francis McLean, Duhane Lam and Olen Richard Vanderleeden | |

It is certified that error appears in the above-identified patent and that said Letters Patent is hereby corrected as shown below:

Column 9; Line 28, change "plenums (36) contain" to --plenum (36) contains--

Column 9, Line 55, change "second process layers" to --second process layer--

Column 9, Line 56, change "adjacent unit reactors" to --an adjacent unit reactor--

Column 11, Line 59, insert --,-- between "exchange membrane" and "a"

Column 12, Line 60, insert --unit reactor-- between "each" and "comprising"

Column 12, Line 62, insert --that-- between "cavity" and "comprises"

Signed and Sealed this

Third Day of June, 2008

JON W. DUDAS
*Director of the United States Patent and Trademark Office*